Dec. 17, 1946.  W. N. AXE  2,412,595
PROCESS FOR REACTION OF AROMATIC HYDROCARBONS WITH
NORMALLY GASEOUS UNSATURATED HYDROCARBONS
Filed March 3, 1942
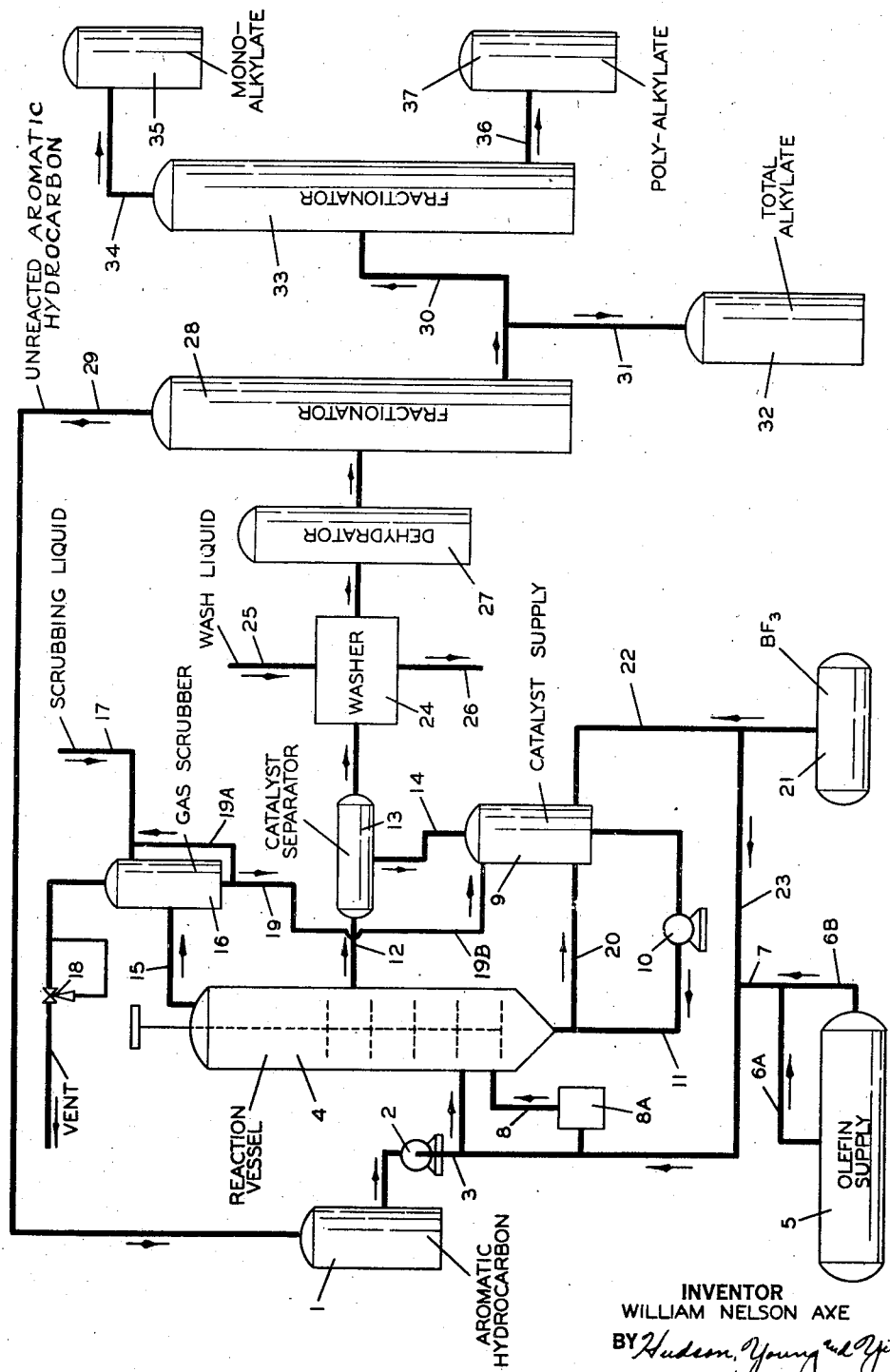
INVENTOR
WILLIAM NELSON AXE
BY Hudson, Young and Yinger
ATTORNEYS Patented Dec. 17, 1946

2,412,595

UNITED STATES PATENT OFFICE 2,412,595

PROCESS FOR REACTION OF AROMATIC HYDROCARBONS WITH NORMALLY GASEOUS UNSATURATED HYDROCARBONS

William N. Axe, Bartlesville, Okla., assignor to Phillips Petroleum Company, a corporation of Delaware Application March 3, 1942, Serial No. 433,191

9 Claims. (Cl. 260—671)

1

The present invention relates to a process for the alkylation of aromatic hydrocarbons. More specifically, it relates to the alkylation of aromatic hydrocarbons with low-boiling aliphatic olefins. Still more specifically, this invention relates to a process for the alkylation of aromatic hydrocarbons wherein new and valuable improvements are made possible through the use of a novel alkylation catalyst composition.

The alkylation of aromatic hydrocarbons wherein an alkyl, cycloalkyl or aralkyl group is introduced into the aromatic nucleus has long been known and has been practiced under a variety of conditions. Classical alkylation procedures involved the action of alkyl halides or alcohols on aromatic hydrocarbons in the presence of so-called Friedel-Crafts catalysts including such materials as aluminum chloride and bromide, ferric chloride, and the like. More recently, direct use of olefins instead of the corresponding alcohols and/or alkyl halides has been proposed as the said olefins become more available from sources such as the petroleum industry.

In the alkylation of aromatic hydrocarbons with olefins, the classical catalysts have been employed, often with so-called activators, to modify reaction conditions. Other suggested catalysts include analogous salts such as zinc, stannic and titanium chlorides, boron halides, and sulfuric acid. Since all these materials are capable of olefin polymerization, it has been necessary to carefully regulate reaction conditions in order to maintain alkylation as the predominant reaction. Even with precautions, poor yields based on both olefins and aromatics, excessive sludge formation, high catalyst consumption, and uncontrolled alkylation have usually resulted since catalysts active enough to initiate alkylation have heretofore caused concurrent polymerization and poly-alkylation.

For example, with aluminum chloride, the quantities of catalyst required so far exceed normal catalytic proportions that the catalyst costs and aluminum chloride sludge formation have been excessive. Also, in the use of sulfuric acid, only the less reactive olefins such as ethylene or propylene can be employed, since polymerization is appreciable with high homologues. Furthermore, a great part of the difficulty in preparing mono-alkylated aromatics has resulted from the difference in the rate and/or ease of alkylation of the original aromatic and the mono-alkylated derivative. The latter is apparently so much more reactive toward the olefin that conventional alkylation catalysts and techniques have heretofore produced substantial proportions of the polyalkylated compounds under conditions necessary to produce alkylation.

It is an object of this invention to provide a process for the alkylation of aromatic hydrocarbons with olefins employing a more selective catalyst than has heretofore been known. It is a further object of this invention to provide an alkylation process operable at such mild conditions of temperature and pressure that extraordinary economy in operation is realized. It is a still further object of this invention to provide a process for the alkylation of aromatic hydrocarbons wherein yields of mono-alkylated products are higher than have previously been obtainable without any sacrifice of conversion efficiency. These and other objects and advantages will be apparent from the following disclosure.

I have now discovered that the alkylation of aromatic compounds such as benzene and its homologues with olefinic hydrocarbons is smoothly and completely catalyzed by an addition compound of boron fluoride and ortho-phosphoric acid with such efficiency that the yield of mono-alkylated products may closely approach theoretical proportions at the point of substantially complete olefin conversion. While the process utilizing this reaction may be operated under a rather wide range of mild conditions and with a variety of both aromatic, olefinic, and in some cases diolefinic, compounds without seriously affecting the yield and/or efficiency, it often comprises the contacting of controlled proportions of aromatic hydrocarbon and alkylating agent with a liquid boron fluoride-ortho-phosphoric acid catalyst in a manner that produces substantially complete reactions. The hydrocarbon reaction mixture is either intermittently or continuously separated from the catalyst, and the alkylate recovered by distillation from the excess of aromatic hydrocarbon. Subsequent fractionation of the alkylate may be utilized to remove minor amounts of polyalkylated products from the mono-alkylated compound, and unconverted aromatic compound may be returned to the reaction zone with additional quantities of alkylating agent.

A specific embodiment of the process is illustrated in the flow diagram of the drawing which shows an arrangement of process equipment for the continuous or semi-continuous alkylation of an aromatic hydrocarbon with an olefin hydrocarbon. For the purpose of simplifying the detailed description of the flow diagram, it will be assumed that benzene is being alkylated with a normally gaseous olefin such as ethylene or propylene, although such simplification should not be construed as limitation.

In the drawing, the benzene feed from vessel 1 is charged by pump 2 through line 3 to reaction vessel 4. This reaction vessel is equipped with a mechanical means of agitation to provide intimate contact between the liquid catalyst phase contained therein and the substantially immiscible hydrocarbon phase circulated therethrough. The benzene feed is added in admixture with controlled mol proportions of olefin from supply vessel 5. This latter supply vessel is illustrated as a pressure tank from which the olefin may be taken as a gas through line 6A or as a liquid through line 6B, and thence through line 7 for admixture with the benzene in line 3. Alternately, the olefin may be introduced separately to the reaction vessel through line 8.

The alkylation reaction occurring in vessel 4 is timed for suitable conversion of the olefin during contact with catalyst supplied from vessel 9, pump 10 (or the equivalent), and line 11. A partial gravity separation between hydrocarbon and catalyst may thus be obtained in the upper portion of vessel 4 after the agitation period and the hydrocarbon phase is withdrawn through a take-off line 12. This line which may embody a liquid-level control device is located along the vertical axis of the reactor in accordance with the flow rate of hydrocarbons and the time required for reaction. The liquid withdrawn through line 12 passes to separator 13 for separation and removal of suspended catalyst through line 14 to supply vessel 9. Any gas issuing from vessel 4, such as unreacted components of the olefin feed, as where a normally gaseous olefin such as ethylene or butadiene is the alkylating olefin, passes through line 15 to scrubber 16 wherein the gas is scrubbed with a selective solvent for boron fluoride which may be present in minor amounts therein due to mechanical loss, decomposition of catalyst complex by saturated components of the olefin feed, etc. This solvent is conveniently phosphoric acid similar to that used in preparing the original catalyst, and may flow as shown through line 17, scrubber 16, and line 19 to be used as described hereinafter. The scrubbed gas then is vented through pressure control valve 18 which maintains the desired pressure in the system.

The alkylate, substantially free of suspended catalyst, is next washed in vessel 24 with a reagent which removes any dissolved boron fluoride. Water is most satisfactory for this purpose and may flow as shown through line 25 into the scrubber and out through line 26. Entrained washing liquid and traces of acidic components in the alkylate leaving vessel 25 may be removed by percolation over an alkaline coagulating and/or dehydrating material in vessel 27. The washed liquid is then fractionated in column 28, wherein unalkylated benzene is taken overhead and returned by line 29 to storage vessel 1. The total alkylate is removed by line 30 and may be utilized as the final product when taken through line 31 to storage vessel 32. Alternately, substantially pure mono-alkylate may be obtained by fractionation of the total alkylate in column 33, with the mono-alkylate being taken overhead through line 34 to storage 35, and the bottoms comprising poly-alkylated products being removed through line 36 to storage 37.

It may be desirable, also, in this type of operation to periodically or continuously withdraw portions of the catalyst in the reaction vessel and to reactivate or replace the withdrawn material with fresh catalyst. This withdrawal is indicated by line 20 which leads to the supply vessel 9. This latter vessel may also serve for the preparation of the catalyst with boron fluoride admitted to prepare and/or reactivate the catalyst from source 21 and line 22. Also, in some cases when alkylating with ethylene or propylene containing unreactive diluents, it may even be desirable to admit minor amounts of boron fluoride continuously through line 23 to the olefin feed stream. Higher olefins are not ordinarily adapted to such a procedure. Instead of adding minor amounts of boron fluoride as such, frequently I find it desirable to pass the normally gaseous olefin feed entering via line 8 through a body of spent catalyst contained in unit 8A whereby this spent catalyst liberates free boron fluoride thereto.

When phosphoric acid is used to scrub boron fluoride from gases issuing from the reaction vessel, this scrubbing liquid may be recirculated repeatedly, as through line 19A, until considerable amounts of boron fluoride are absorbed. This partially prepared catalyst may then be placed in the catalyst preparation vessel and boron fluoride added to complete the catalyst preparation according to the following description. To this end, the phosphoric acid which passes from scrubber 16 through line 19 may be passed through line 19B to supply vessel 9.

The boron fluoride-ortho-phosphoric acid catalyst of this invention is prepared by adding gaseous boron fluoride to the acid or aqueous solutions thereof. The resulting reaction is exothermic, and the rate of $BF_3$ addition is usually controlled, together with external cooling of the addition product, to avoid temperatures much above about 200° F. which may prolong the preparation. Saturation of the acid and completion of the preparation is denoted by escaping $BF_3$ fumes.

The exact mechanism of the addition reaction and/or the formulas of the compounds formed in the preparation of the catalyst are not always known, but it is fairly well established that two reactions occur. One is the formation of boron fluoride hydrate with any water present with the ortho-phosphoric acid; the other is the formation of an addition compound of boron fluoride and ortho-phosphoric acid containing approximately equi-molecular proportions of each. For example, when using 85 per cent acid, the amount of boron fluoride absorbed corresponds to formation of the $BF_3.H_3PO_4$ addition compound plus sufficient boron fluoride to form a hydrate with 15 weight per cent of water present. At saturation under the above-mentioned conditions, this hydrate represents an $H_2O:BF_3$ mol ratio of slightly over 1:1.

The ortho-phosphoric acid employed may be the concentrated acid ranging from the 85 per cent acid of commercial grade up to about 100 per cent $H_3PO_4$. Or, aqueous solutions containing as little as 20 to 40 per cent $H_3PO_4$ may be employed. For most applications, a moderately concentrated to concentrated acid (i. e. from about 70% to about 100% $H_3PO_4$) is preferred since such preparations show greater activity over longer periods than those containing larger proportions of boron fluoride hydrate and smaller proportions of the $H_3PO_4$ addition compound.

In this connection, it has been definitely established that the hydrate is not the principal active ingredient of the catalyst, although it may promote and/or cooperate in the activity of the $BF_3.H_3PO_4$ complex in some obscure fashion. Thus, boron fluoride hydrate to which phosphoric acid has been added (regardless of the proportions) is relatively inactive and does not exhibit the qualities of the catalyst prepared according to this invention. Similarly, when an active catalyst of my preferred composition loses appreciable quantities of boron fluoride during use, it becomes less active.

The addition of a slight excess of phosphoric acid to a normally active catalyst results in a condition approximating spent catalyst. On the other hand, addition of boron fluoride hydrate to an active catalyst does not materially impair its activity. From this evidence it may be deduced that decomposition of the phosphoric acid complex ($BF_3.H_3PO_4$) is the primary reaction controlling catalyst life, and this complex is therefore the essential ingredient of the catalyst composition.

As a consequence, my preferred catalysts do not reach maximum activity until the phosphoric acid solution is saturated with boron fluoride. Thus, it will be apparent that from the standpoint of both the catalyst cost and activity, it is more efficient to employ concentrated acid solutions to decrease the quantity of the boron fluoride consumed in hydrate formation. On the other hand, 95 to 100 per cent phosphoric acid is relatively expensive and tends to solidify at moderately low temperatures so that 70 to 90 per cent concentrations are often preferred. However, after addition of boron fluoride, the finished catalyst is a heavy liquid which shows no tendency to solidify at temperatures as low as —40° F.

It has also been established that a mineral acid is not in itself responsible for the peculiar alkylating activity of the catalyst composition, since substitution of other mineral acids produces catalysts of greatly different characteristics. This is particularly true of sulfuric acid which, although previously employed alone as an alkylation catalyst, when saturated with boron fluoride or mixed with boron fluoride hydrate does not produce a catalyst comparable to my preferred composition. This latter circumstance is apparently due to the fact that sulfuric acid does not form a boron fluoride addition complex as does phosphoric acid, and the catalysts, therefore, do not have analogous compositions or properties. The sulfuric acid-boron fluoride hydrate catalyst thus exhibits only a somewhat modified composite of the properties of the two ingredients, whereas the catalysts of the present invention exhibit entirely new properties resulting from the new chemical compositions formed from the ingredients.

The reaction conditions most favorable for the process of this invention depend to a large extent on the nature of the reactants and the desired product. The conditions of flow rate, temperature, and mol proportions of reactants may be somewhat different when using ethylene or propylene than when using higher olefins such as butylenes, pentenes or the cyclic olefins which may exhibit appreciable differences in reactivity. Also, more careful control of contact time and olefin concentration must be exercised when preparing mono-alkylates of the more reactive aromatic compounds. Therefore, the specific conditions for each particular application will be influenced or determined by the following general considerations.

In the preparation of mono-alkylated compounds, it is desirable to operate with an excess of the aromatic feed in order to reduce the olefin concentration and the probability of reaction of olefin with mono-alkylate. Thus in the prior art, in order to obtain fair yields of mono-alkylate, huge excesses of the aromatic compound have been employed in the reaction mixture and thus handled through the entire system of process equipment. With the catalyst of the present invention, high yields of mono-alkylate are obtained with only a moderate excess of aromatic compound in the reaction vessel. Thus, it is usually preferred to maintain minimum benzene-propylene ratios of at about 1.5:1 in order to obtain maximum yields of isopropylbenzene. With lower ratios in the neighborhood of 1:1, the yield of monoalkylate may be somewhat decreased while higher ratios above about 4:1 are of little benefit since the results are no better and operating costs are greatly increased.

The temperature in the reaction zone is also chosen in conformity with the nature of the reactants and the desired products. In order to control the rate of alkylation and maintain high yield of mono-alkylate, temperatures are usually employed within the range of from about 40° to about 200° F. with a narrower range of about 80° to about 120° F. often preferred for reactions employing ethylene and propylene as the alkylating agents. Since the alkylation is an exothermic reaction, means are ordinarily provided to remove any excess heat of reaction. Such means may include water cooling of the reaction vessel or equivalent heat transfer methods. In many cases, it is convenient to carefully regulate the rate of cooling so that the heat of reaction at any desired rate of reactant feed is sufficient to maintain the temperature of the reaction zone within a preferred range.

Pressures are chosen in accordance with reaction requirements involving the relative ease and rate of alkylation, and are usually about atmospheric or low superatmospheric pressure between zero and 100 pounds gage. With the catalyst compositions of the present invention, high pressures are not required. The only function served by elevated pressures is the increased concentration of olefin in the reaction zone. Even ethylene, which is the most refractory of olefins, has been used to alkylate benzene with a satisfactory reaction velocity at atmospheric pressure in the presence of my preferred catalyst. In most cases, since the unrestricted passage of vapors through the reaction zone is eventually detrimental to the catalyst, gaseous olefins such as ethylene or propylene are added at such a rate that substantially complete reaction of the olefin occurs, or the pressure may be regulated to provide maximum olefin concentrations as dictated by the chosen aromatic-olefin mol ratio.

The alkylating agents which may be employed in the present invention include the aliphatic and cyclo-aliphatic olefins such as ethylene, propylene, butylenes, pentenes, etc., and cyclopropene, cyclobutene, cyclopentene, cyclohexene and other alkyl-substituted cyclo-olefins. These compounds may be employed in substantially pure form or in mixtures with corresponding paraffins or substantially inert fluids. Mixtures of two or more olefins may be used if the alkylated products are to be utilized as the corresponding mixtures and/or segregated by fractionation. Alkylation may also be performed with diolefins such as butadiene, to produce the corresponding alkenyl benzene. However, since these products are unsaturated, diolefins are ordinarily removed from olefin feed stocks prior to their use in the manufacture of alkyl benzenes.

When the olefin feed contains appreciable amounts of unreactive components such as ethane in ethylene, propane in propylene or other harmless but substantially inert gases, the passage of the gas through the catalyst hydrocarbon mixture may result in the evolution of minor amounts of boron fluoride from the catalyst. These gases, however, may be scrubbed free of boron fluoride with phosphoric acid, or even with portions of the catalyst composition from which the boron fluoride was evolved and loss from the system thus prevented. Usually this removal of boron fluoride is so gradual that the loss of catalyst activity is negligible over long periods of operations, and the recovery and regeneration methods illustrated previously adequately provide for retention of substantially all boron fluoride with the exception of traces dissolved in the outgoing stream of liquid hydrocarbons.

For the preparation of the preferred mono-alkylated aromatics, benzene or a similarly unsubstituted aromatic compound is, of course, a necessary starting material. Derivatives of substituted benzenes, for example, may also be prepared when poly-alkylated compounds are desired. In the latter case, the selectivity of the catalyst in restricting the extent of alkylation is somewhat decreased due to the effect of the alkyl substituent already present but the reaction is still highly efficient.

As indicated above, the alkylation may be carried out with the liquid aromatic hydrocarbon serving as the reaction medium since the concentration of olefin alkylating agent is effectively controlled ahead of the reaction zone. Alternately, the aromatic hydrocarbon may be mixed with and/or dissolved in a suitable inert liquid solvent such as the paraffin or cycloparaffin hydrocarbons of five to eight or more carbon atoms. This arrangement is of particular importance when operating at temperatures such that the aromatic hydrocarbon is a solid, since it allows dispersion and satisfactory alkylation of the solid compound in a solvent which simultaneously serves as a solvent for the olefin alkylating agent.

The quantity of catalyst required to promote the alkylation reaction under the conditions outlined is dependent on such factors as the efficiency of agitating or contacting devices and the reactivity of the olefin alkylating agent. In some instances, as little as one volume of catalyst in 10 to 20 or more volumes of the hydrocarbon phase may be satisfactory, while in other reactions this volume ratio may be as high as 1:1. With extremely large volumes of catalyst present in the reaction zone, olefins such as butenes, pentenes, and the higher homologues may be dissolved in the catalyst to a limited extent and consumed in side reactions such as polymerization, esterification, and the like, so that such mixture proportions are usually avoided. The boron fluoride-phosphoric acid catalysts exhibit very slight mutual solubility with hydrocarbons, and separation of the catalyst at any stage of the process out of the zone of mixing or agitation is conveniently effected by gravity separation from the lighter hydrocarbon phase. The rapidity of such separation is greatly promoted by the great difference in specific gravity of the two liquid phases.

The catalyst of this invention may be employed over extremely long periods to alkylate large volumes of aromatic compounds without appreciable loss of activity, particularly when employing ethylene or propylene as the alkylating agent. With higher olefins which gradually form alkyl derivatives of the catalyst or polymers, there is a slow loss of activity which may eventually require replacement of the catalyst after treatment of about 50 to 200 or more volumes of hydrocarbon per volume of catalyst. With ethylene gas as the alkylating agent, or with propylene or butylene gases containing unreactive components, the previously mentioned devices for replacement of minor losses of boron fluoride are substantially the sole measures necessary to obtain extremely long catalyst life. This feature is in direct contrast to the behavior of such catalysts as aluminum halides, sulfuric acid, and the like which must be used in relatively large quantities and which rapidly deteriorate into inactive sludges with consequent losses of both catalyst and reactant.

Under the most favorable conditions for monoalkylate production, the present process is capable of producing very high yields of mono-alkylated aromatics. Thus, mono-alkylate yields based on the total alkylate produced may range from about 80 to 98 per cent. Even without elaborate control methods, poly-alkylated products seldom amount to more than 15 to 20 per cent of the total alkylate when employing the lower aliphatic olefins as alkylating agents. This feature is again in direct contrast to processes using sulfuric acid and other less selective catalysts which may produce alkylate mixtures containing no more than 30 to 50 per cent of mono-alkylate along with large amounts of compounds representing the maximum extent of substitution in the aromatic nucleus.

However, the above-mentioned special qualities of the boron fluoride-ortho-phosphoric acid catalyst do not preclude poly-alkylate formation when the production of poly-substituted aromatics is desired. With proper adjustment of the aromatic-olefin mol ratio, and corresponding obvious revision of reaction conditions, high yields of di- and tri-alkylated aromatics may be obtained with efficient operation and excellent catalyst life.

The following exemplary operations will serve to illustrate specific procedures in carrying out the process of this invention and the improved results obtainable thereby. However, since the examples and the possible modifications could be multiplied indefinitely, no limitation is intended.

*Example 1*

In a batch-type operation, a reaction flask fitted with a mechanical stirrer was charged with four mols of benzene and 50 ml. of catalyst prepared by saturating 85 per cent ortho-phosphoric acid with boron fluoride. While the mixture was agitated to maintain the catalyst in suspension, gaseous propylene was introduced at substantially atmospheric pressure and a rate of about 0.4 mol per hour. The reaction flask was maintained at a temperature of 80 to 85° F. and the propylene was almost completely reacted. After about 3.5 mols of propylene were added, the reaction was stopped, and the hydrocarbons separated from the catalyst. On distillation, slightly over 0.5 mol of unreacted benzene was recovered, and the total alkylate contained 88 per cent of isopropylbenzene.

In similar experiments under substantially identical conditions, catalysts prepared from 60, 92, and 98 per cent $H_3PO_4$ were utilized. The first produced a total alkylate containing 85 per cent isopropylbenzene. The second and third catalysts produced alkylate containing 82 per cent of the mono-alkylate.

When 85 per cent sulfuric acid was used instead of phosphoric acid under identical conditions, the yield of isopropylbenzene was only about 60 per cent of the total alkylate, and a large proportion of the propylene passed through the reaction zone unreacted.

Example 2

Benzene was alkylated with propylene in a continuous operation wherein a mixture of benzene and propylene in a mol ratio about 4:1 was passed through a reaction zone containing 50 ml. of catalyst prepared from 85 per cent $H_3PO_4$ and $BF_3$. The flow rate was about two mols of mixture per hour, and the propylene was substantially completely reacted at a temperature of 80 to 90° F. The hydrocarbon effluent was settled free of entrained catalyst, and the latter was returned to the reaction zone. The reaction proceeded for 32 hours with no loss of catalyst activity.

The hydrocarbon effluent was fractionated to recover unreacted benzene, and the alkylate was then fractionated to separate mono- and di-isopropylbenzene. The mono-alkylate was about 95 per cent and the di-alkylate about five per cent of the total.

In a similar experiment with a benzene-propylene ratio of 1.5:1, the yield of isopropylbenzene was 92 per cent of the alkylated products.

Example 3

A mixture of 4.5 mols of benzene and 100 ml. of $BF_3$-$H_3PO_4$ catalyst made from 85 per cent acid was stirred in a reaction vessel while about four mols of ethylene were passed in at a pressure about one pound gage. The reaction temperature ranged from about 85 to about 100° F. varying with the ethylene absorption rate. The reaction was halted when sufficient ethylene had been absorbed to convert over 70 per cent of the benzene. The liquid products were withdrawn, washed and fractionated to remove unreacted benzene, and the alkylated products were fractionated to separate ethylbenzene from the polyalkylated benzenes. The ethylbenzene was 85 per cent of the total alkylate, and the remainder was di-ethylbenzene.

The small amount of gas escaping from the reaction flask was scrubbed with 85 per cent phosphoric acid, and several grams of boron fluoride were recovered. The catalyst was again saturated with boron fluoride and restored to its original activity.

Example 4

The operation to Example 3 was repeated under identical conditions except that the pressure was raised to 100 pounds gage. Three mols of ethylene were added to the benzene-catalyst mixture, at a rate corresponding to substantially complete reaction. The total alkylate contained about 75 per cent of ethylbenzene and over 20 per cent of di-ethylbenzene.

Example 5

In a continuous operation similar to that described in Example 2, the alkylation of benzene with ethylene was carried out at 85 to 95° F. and substantially atmospheric pressure. The average mol ratio of benzene to ethylene was 2:1 and ethylene conversion was over 80 per cent per pass. The catalyst withdrawn in suspension in the effluent liquid was re-saturated with boron fluoride prior to its return to the reaction zone so that there was no appreciable loss of activity. Fractionation of the total alkylate produced over 90 per cent of ethyl benzene.

Example 6

Butene-2 vapor was passed into a mixture of two mols of benzene with 50 ml. of $BF_3$-$H_3PO_4$ catalyst until one mol of olefin had been absorbed. The temperature was 85 to 90° F. The yield of sec-butyl benzene was 85 per cent of the total alkylate.

Example 7

Isobutylene was passed into a mixture of four mols of benzene and 50 ml. of catalyst prepared from 85 per cent $H_3PO_4$ at a temperature of 80 to 84° F. and atmospheric pressure. After four mols of isobutylene had been added, the reaction was halted and the alkylated products were separated and fractionated. The yield of monobutyl benzenes (iso- and tertiary) was 50 per cent of the alkylate, indicating a more rapid production of higher alkylate with the more reactive isobutylene and/or di-isobutylene. No isobutylene polymers were formed.

Example 8

Benzene was alkylated with pentene-2 by adding the liquid olefin dropwise to a stirred mixture of benzene and $BF_3$-$H_3PO_4$ catalyst. Two mols of pentene were thus added to three mols of benzene, producing an alkylate containing 80 per cent of 2-phenylpentane.

Example 9

Naphthalene was dissolved in cyclohexane and stirred with $BF_3$-$H_3PO_4$ catalyst while propylene was passed into the mixture at 85 to 90° F. Almost theoretical conversion to isopropylnaphthalene was obtained.

Example 10

Two mols of butadiene vapor were passed at a moderate flow rate into a mixture of four mols of benzene and 50 ml. of $BF_3$-$H_3PO_4$ catalyst at 85 to 88° F. The benzene-alkylate solution yielded over 80 per cent of phenylbutenes boiling between 355 and 365° F. No butadiene polymers were identified in the products.

While the foregoing descriptive matter and examples have been relatively specific for the purpose of illustrating the novelty and important improvements of the present invention, numerous modifications and alternative operations will be apparent and, therefore, are considered within the scope of my disclosure. No limitations are implied except as recited in the following claims.

I claim:

1. A process for the alkylation of benzene with ethylene which comprises passing a major proportion of benzene and a minor proportion of ethylene at a temperature in the range of about 80° F. to about 120° F. and at a pressure in the range of zero to about 100 pounds gage into intimate contact with a catalyst comprising essentially the addition compound of boron fluoride and ortho-phosphoric acid and prepared by saturating concentrated ortho-phosphoric acid with boron fluoride, whereby alkylation occurs to form ethylbenzenes, continuously withdrawing liquid and gaseous effluents from the reaction zone, scrubbing the gaseous effluent with phosphoric acid to recover boron fluoride, separating entrained catalyst from the liquid effluent for return to the reaction zone, fractionating the liquid hydrocarbons to separate unreacted benzene which is returned to the reaction zone with further amounts of ethylene, and finally fractionating the ethylbenzenes to recover a major proportion of mono-ethylbenzene and a minor proportion of di-ethylbenzene.

2. A process as in claim 1 wherein the catalyst is re-saturated with boron fluoride prior to recycling to the reaction zone.

3. A process as in claim 1 wherein an amount of boron fluoride substantially equivalent to that withdrawn with the gaseous effluent is added with the ethylene feed.

4. A process for the reaction of aromatic hydrocarbons with normally gaseous unsaturated hydrocarbons which comprises the simultaneous contacting of said hydrocarbons with a catalyst comprising the addition compound of boron fluoride with ortho-phosphoric acid, in a reaction zone, removing from said reaction zone a gaseous mixture comprising unreacted normally gaseous unsaturated hydrocarbon and minor amounts of boron fluoride, scrubbing said gaseous mixture with ortho-phosphoric acid to remove said boron fluoride therefrom and convert said ortho-phosphoric acid to an addition compound with said boron fluoride, adding boron fluoride thereto as necessary to saturation therewith, and using the resulting material as catalyst in said contacting step.

5. The process of claim 4 wherein said normally gaseous unsaturated hydrocarbon is ethylene.

6. The process of claim 4 wherein said normally gaseous unsaturated hydrocarbon is propylene.

7. The process of claim 4 wherein said normally gaseous unsaturated hydrocarbon is butadiene.

8. A process for reacting a low-boiling aromatic hydrocarbon with a low-boiling unsaturated hydrocarbon, which comprises contacting in a reaction zone a mixture comprising such hydrocarbons, and containing a molar excess of said aromatic hydrocarbon, under reaction conditions with a liquid catalyst comprising essentially an addition compound of boron fluoride and orthophosphoric acid, intimately admixing hydrocarbons effluent from said reaction zone with ortho-phosphoric acid to remove minor quantities of boron fluoride associated therewith, separating from said admixing a material comprising orthophosphoric acid and a resulting complex of ortho-phosphoric acid and boron fluoride and adding thereto additional quantities of boron fluoride to effect substantially complete saturation, and passing the resulting material to said reaction zone as catalyst.

9. A process for the alkylation of benzene with ethylene which comprises passing a major proportion of benzene and a minor proportion of ethylene at a temperature in the range of about 80° F. to about 120° F. and at a pressure in the range of zero to about 100 pounds gage into intimate contact with a catalyst comprising essentially the addition compound of boron fluoride and orthophosphoric acid and prepared by saturating concentrated orthophosphoric acid with boron fluoride, whereby alkylation occurs to form ethylbenzenes, continuously withdrawing liquid and gaseous effluents from the reaction zone, and scrubbing said gaseous effluents with orthophosphoric acid to recover boron fluoride.

WILLIAM N. AXE.